United States Patent
Lee et al.

(10) Patent No.: US 10,129,710 B2
(45) Date of Patent: Nov. 13, 2018

(54) METHOD AND APPARATUS FOR INDICATING STOPPING MBMS TRANSMISSION IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 14/904,386

(22) PCT Filed: Sep. 26, 2014

(86) PCT No.: PCT/KR2014/009002
§ 371 (c)(1),
(2) Date: Jan. 11, 2016

(87) PCT Pub. No.: WO2015/046941
PCT Pub. Date: Apr. 2, 2015

(65) Prior Publication Data
US 2016/0157065 A1    Jun. 2, 2016

Related U.S. Application Data

(60) Provisional application No. 61/883,162, filed on Sep. 26, 2013.

(51) Int. Cl.
*H04W 4/08*    (2009.01)
*H04L 12/18*    (2006.01)
(Continued)

(52) U.S. Cl.
CPC ............ *H04W 4/08* (2013.01); *H04L 12/189* (2013.01); *H04W 4/06* (2013.01); *H04W 68/005* (2013.01);
(Continued)

(58) Field of Classification Search
CPC ................. H04W 4/08; H04W 76/046; H04W 72/0413; H04W 68/005; H04W 4/06;
(Continued)

(56) References Cited

U.S. PATENT DOCUMENTS

2005/0174956 A1    8/2005   Yi et al.
2006/0056347 A1*   3/2006   Kwak ................. H04W 72/005
                                                             370/329

(Continued)

FOREIGN PATENT DOCUMENTS

CN    101707739 A    5/2010
CN    102340743 A    2/2012
(Continued)

OTHER PUBLICATIONS

Qualcomm Incorporated., "GCSE Service continuity during unicast and MBMS switching: S2-133446", SA WG2 Meeting #99, pp. 1-7, Sep. 23, 2013, Xiamen, China.
(Continued)

*Primary Examiner* — Andrew Lai
*Assistant Examiner* — Harry H Kim
(74) *Attorney, Agent, or Firm* — Birch, Stewart, Kolasch & Birch, LLP

(57) ABSTRACT

A method and apparatus for stopping receiving of a multimedia broadcast multicast service (MBMS) data in a wireless communication system is provided. A user equipment (UE), which is receiving a MBMS data of group communication from a network, receives an indication of stopping
(Continued)

receiving the MBMS data from the network, and stops receiving the MBMS data based on the indication.

11 Claims, 9 Drawing Sheets

(51) Int. Cl.
  *H04W 72/00* (2009.01)
  *H04W 72/04* (2009.01)
  *H04W 4/06* (2009.01)
  *H04W 68/00* (2009.01)
  *H04W 76/27* (2018.01)
  *H04W 76/40* (2018.01)

(52) U.S. Cl.
  CPC ....... *H04W 72/005* (2013.01); *H04W 72/042* (2013.01); *H04W 72/0413* (2013.01); *H04W 76/27* (2018.02); *H04L 12/1859* (2013.01); *H04L 12/1895* (2013.01); *H04W 76/40* (2018.02)

(58) Field of Classification Search
  CPC ............. H04W 72/042; H04W 72/005; H04W 76/002; H04L 12/189; H04L 12/1859; H04L 12/1895
  See application file for complete search history.

(56) References Cited

U.S. PATENT DOCUMENTS

| | | | |
|---|---|---|---|
| 2006/0067353 A1* | 3/2006 | Pekonen | H04L 12/189 370/432 |
| 2010/0093312 A1 | 4/2010 | Roh et al. | |
| 2010/0157873 A1 | 6/2010 | Yi et al. | |
| 2010/0157969 A1 | 6/2010 | Swamy et al. | |
| 2014/0198707 A1 | 7/2014 | Wang et al. | |
| 2015/0078241 A1* | 3/2015 | Xu | H04L 12/189 370/312 |
| 2016/0227385 A1 | 8/2016 | Ahmad et al. | |
| 2016/0374050 A1 | 12/2016 | Prasad et al. | |

FOREIGN PATENT DOCUMENTS

| | | |
|---|---|---|
| CN | 102651849 A | 8/2012 |
| CN | 102833684 A | 12/2012 |
| WO | WO 2009/035385 A1 | 3/2009 |
| WO | WO 2012/063950 A1 | 5/2012 |

OTHER PUBLICATIONS

3GPP, "3rd Generation Partnership Project; Technical Specification Group Services and System Aspects; Study on Architecture Enhancements to Support Group Communication System Enablers for LTE (GCSE_LTE) (Release 12)," 3GPP TR 23.768, V0.3.0, Jul. 2013, pp. 1-34.
3GPP, "LTE; Evolved Universal Terrestrial Radio Access (E-UTRA) and Evolved Universal Terrestrial Radio Access Network (E-UTRAN); Overall Description; Stage 2 (Release 11)," ETSI TS 136.300, V11.7.0, Sep. 2013, pp. 1-221 (222 pages total).
General Dynamics Broadband UK, "GCSE_LTE: Analysis of Possible Interactions Between 3GPP and Application Layer Entitles," 3GPP TSG-SAWG1 ad-hoc on GCSE_LTE and ProSe, S1-130034, Prague, Czech Republic, Jan. 23-25, 2013, 10 pages.
Intel, "Update and Evaluation of Solution 4 (GCSE Architecture Using IMS and eMBMS)," SA WG2 Meeting #99, S2-133467, Xiamen, China, Sep. 23-27, 2013, pp. 1-7.
Kyocera, "Analysis of Service Continuity for Group Communication," 3GPP TSG-RAN WG2 #85, R2-140668, Prague, Czech Republic, Feb. 10-14, 2014, pp. 1-3.
Qualcomm Incorporated, "GCSE Service Continuity During Unicast and MBMS Switching," SA WG2 Meeting #99, S2-133446, Xiamen, China, Sep. 23-27, 2013, pp. 1-7.
LG Electronics Inc., "Use of eMBMS for Group Communication," 3GPP TSG-RAN WG2 #83bis, R2-133358, Ljubljana, Slovenia, Oct. 7-10, 2013 (server date Sep. 27, 2013, downloaded by EPO Sep. 28, 2013), pp. 1-6.
Nokia Siemens Networks, "GCSE TR 23.768 current solutions evaluations and near terms goals," SA WG2 Meeting #98, SA WG2 Temporary Document, S2-132689, Valencia, Spain, Jul. 15-19, 2013, pp. 1-6.
Qualcomm Incorporated, "Service Continuity of Group Communication," 3GPP TSG RAN WG2 #85, R2-140052, Prague, Czech Republic, Feb. 10-14, 2014 (server date Feb. 9, 2014), 5 pages.

* cited by examiner

[Fig. 1]
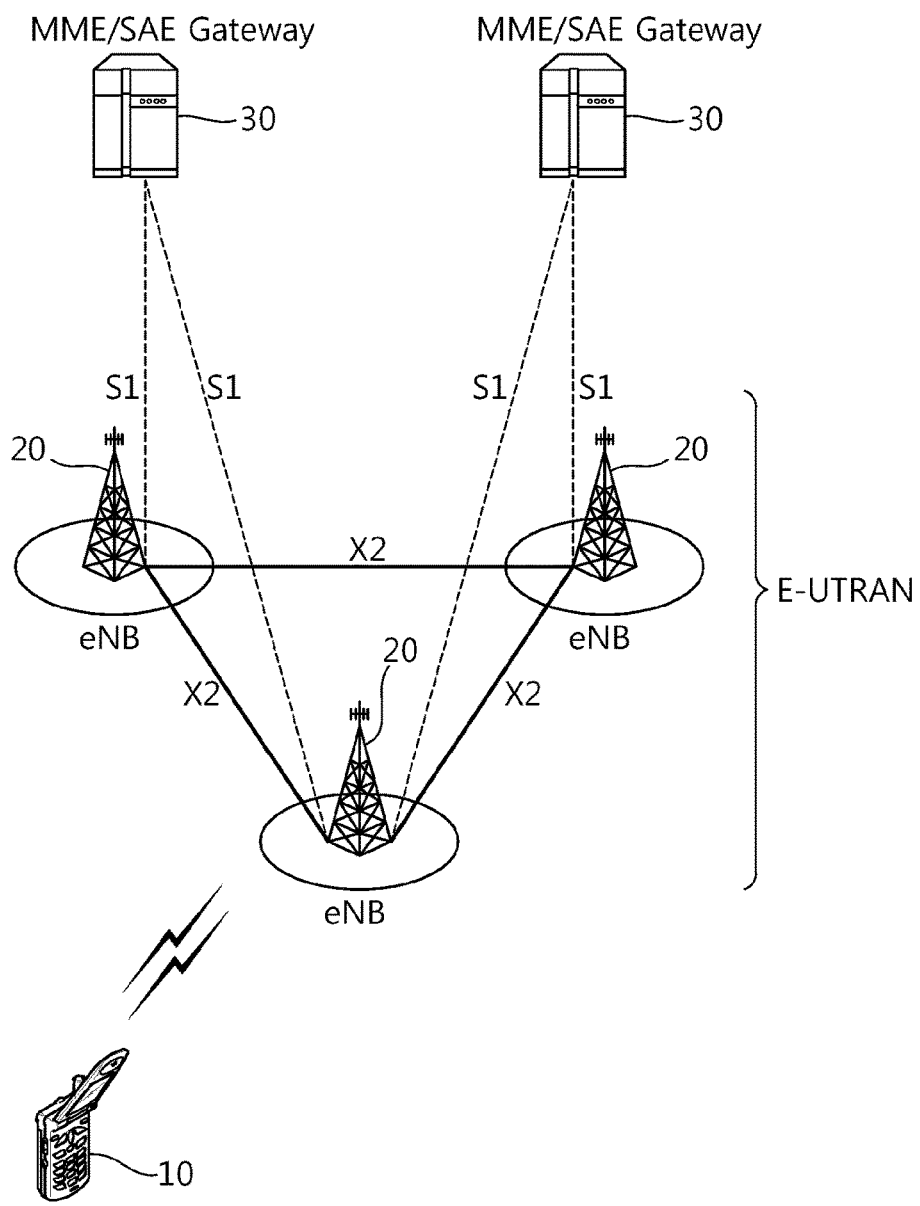

[Fig. 2]
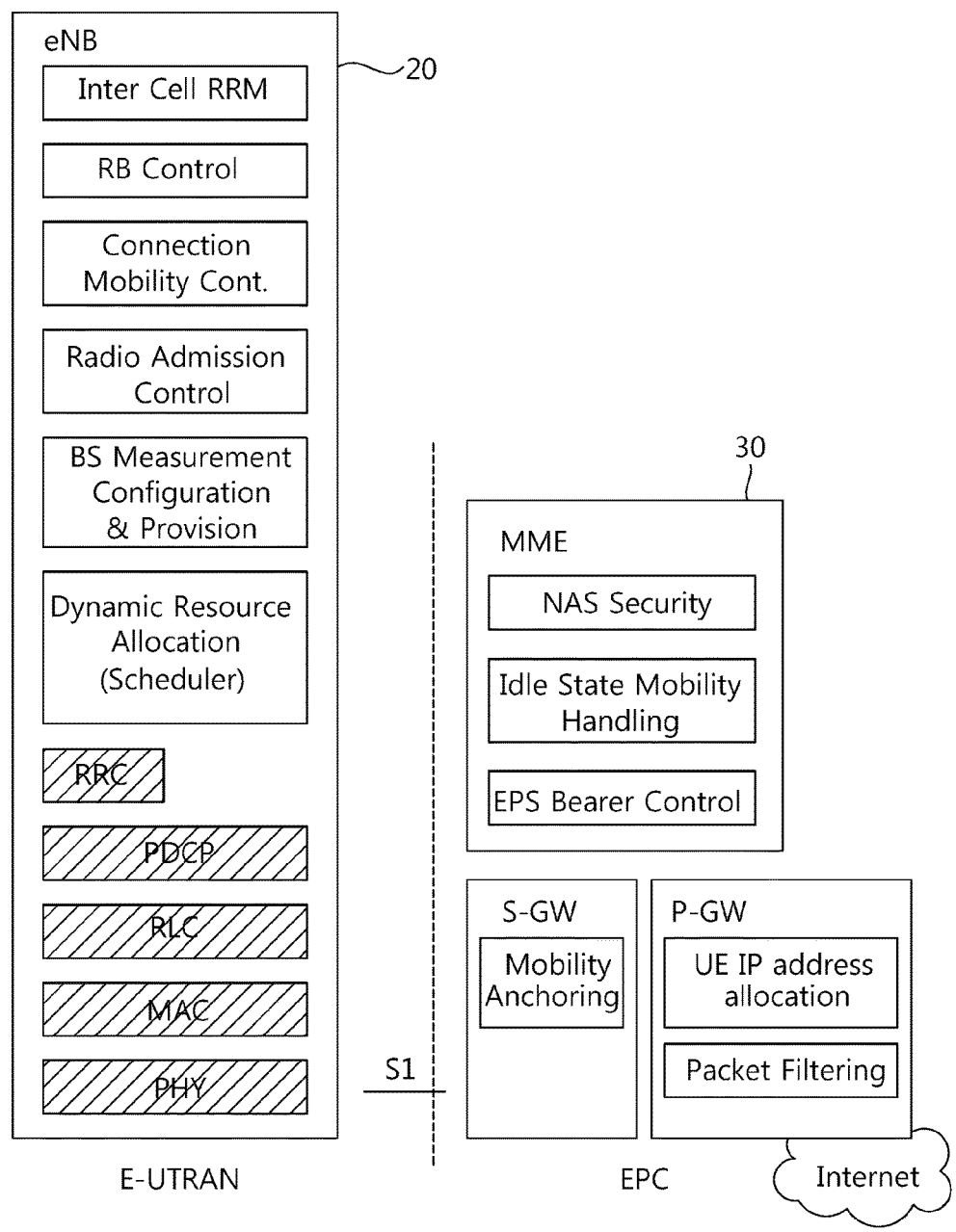

[Fig. 3]
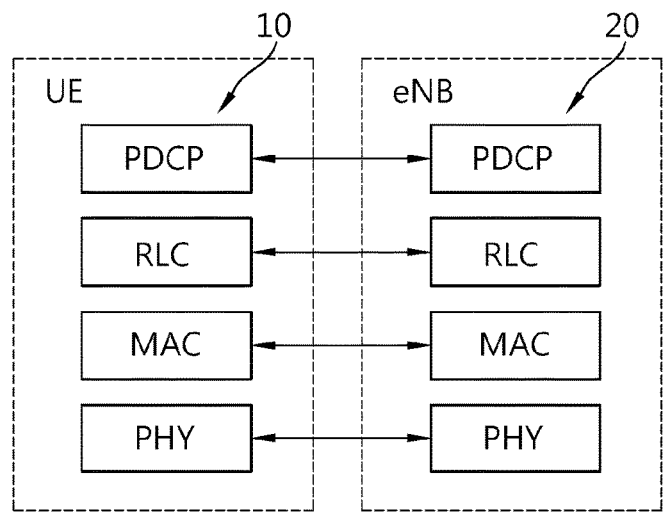
(a)
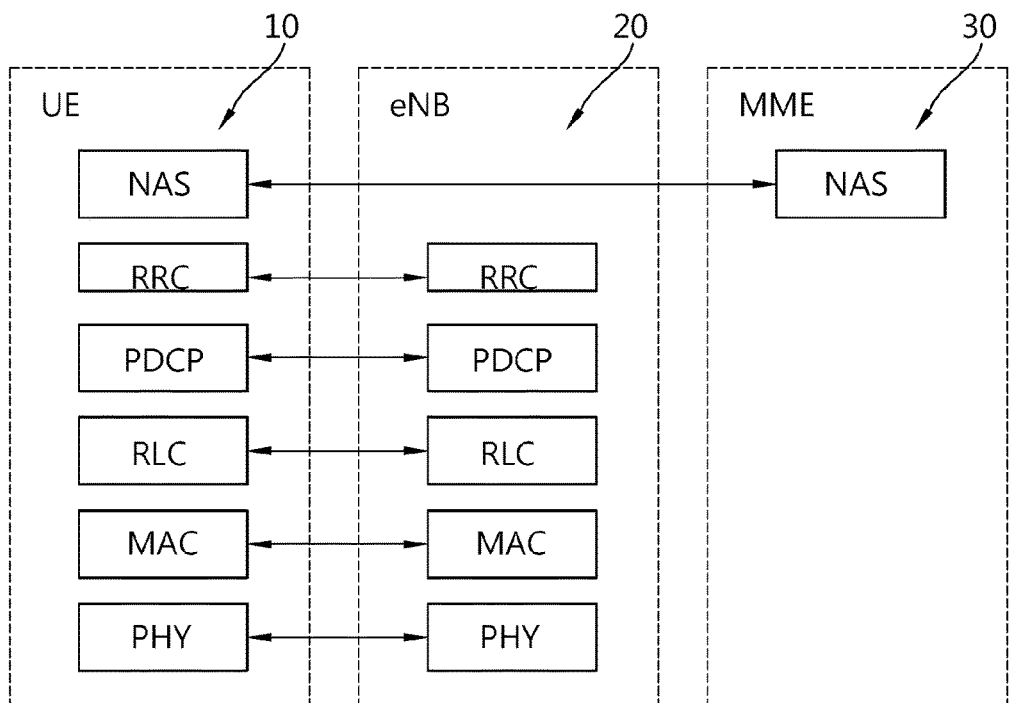
(b)

[Fig. 4]
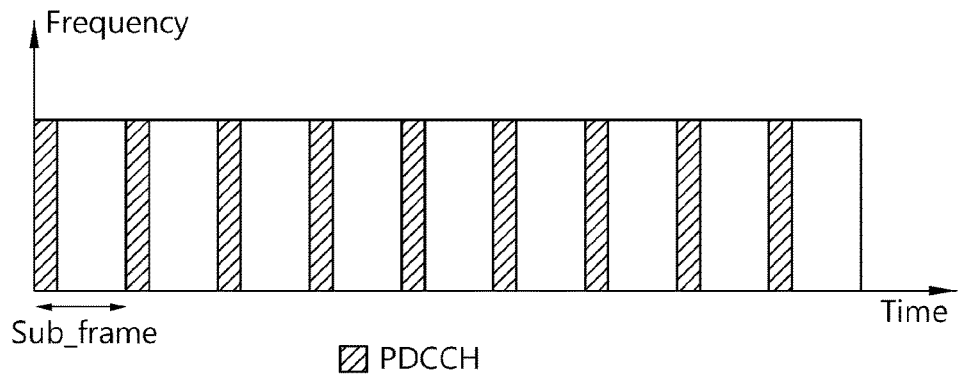
[Fig. 5]
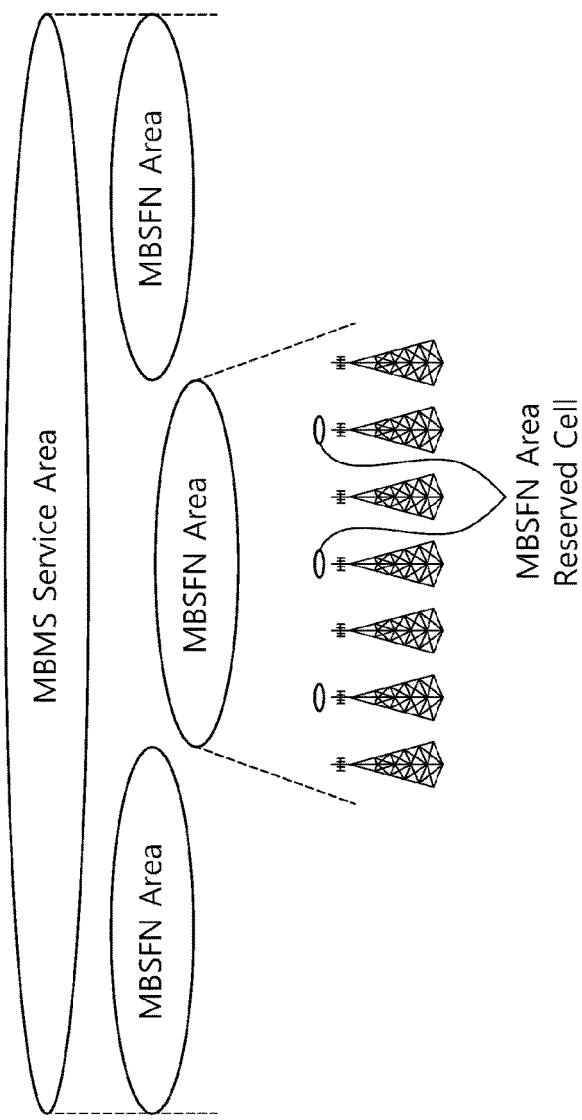

[Fig. 6]
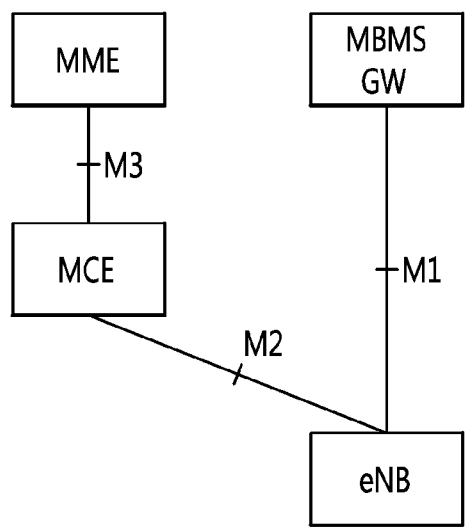
MBMS GW: MBMS Gateway
MCE: Multi-Cell /Multicast Coordination Entity
M1: user plane inter face
M2: E-UTRAN internal control plane interface
M3: control plane interface between E-UTRAN and EPC

[Fig. 7]
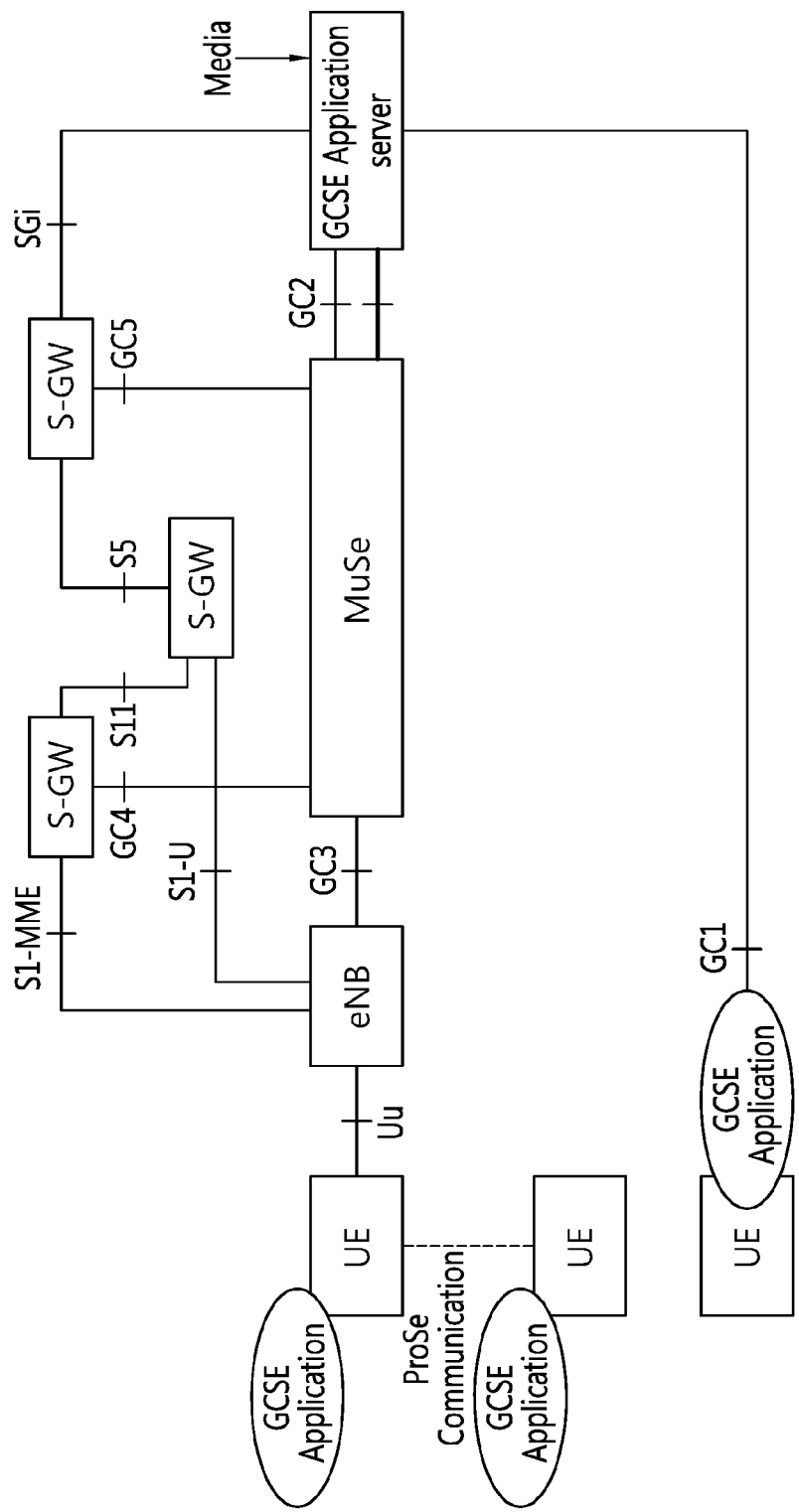

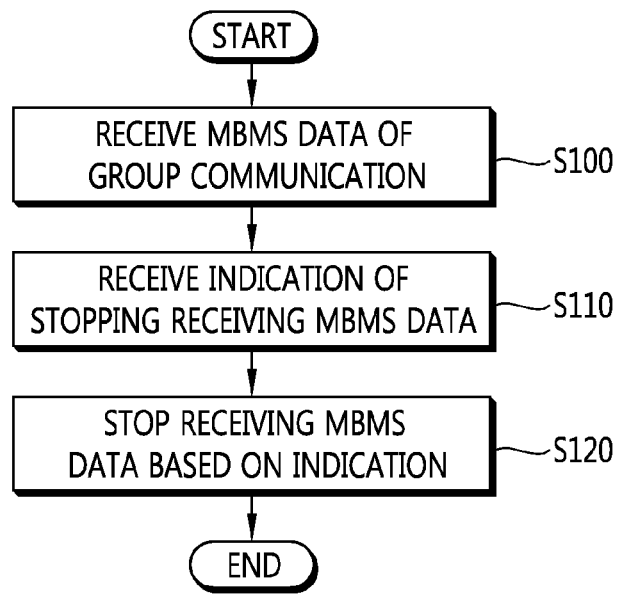
[Fig. 8]

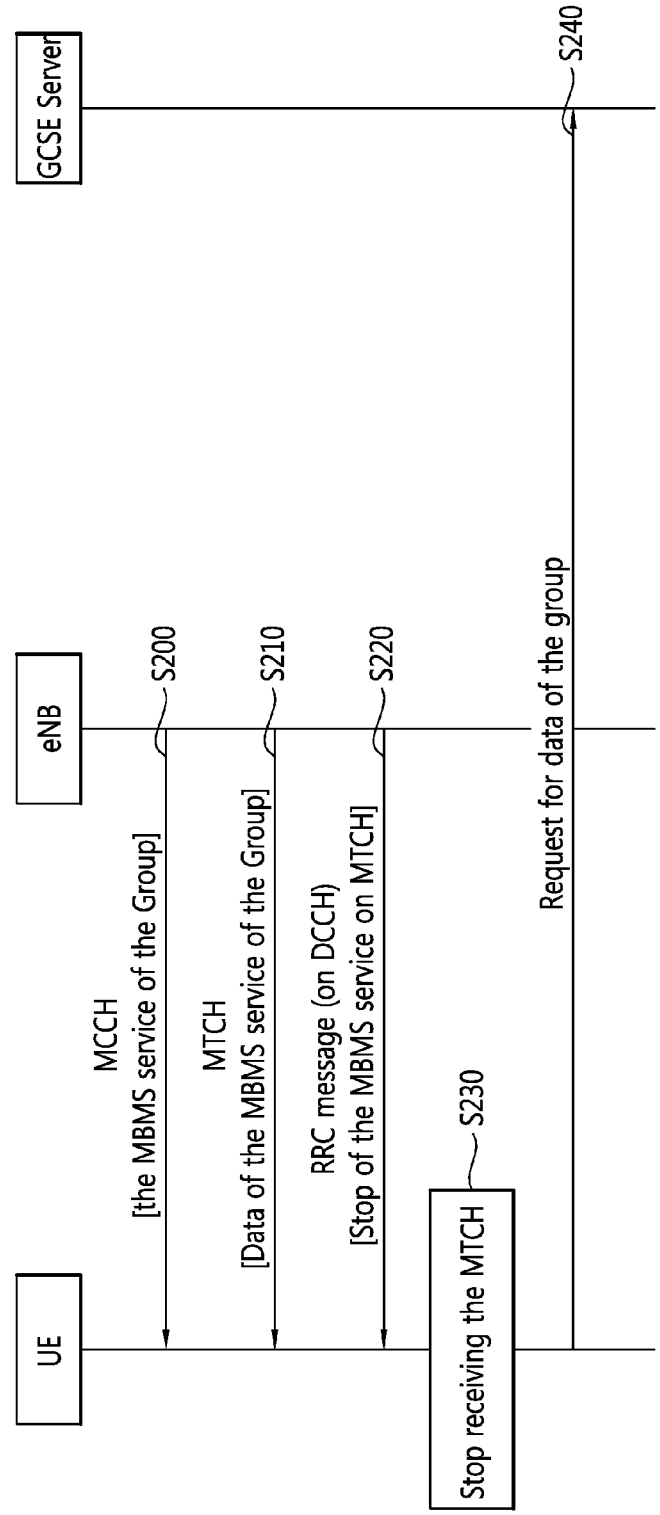
[Fig. 9]

[Fig. 10]
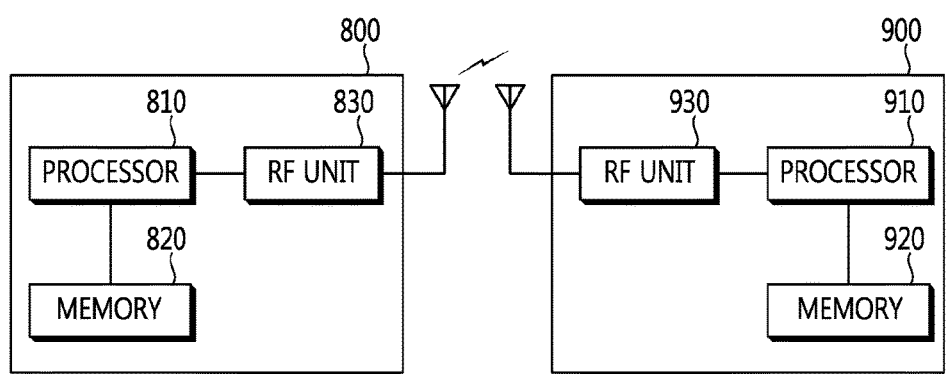

METHOD AND APPARATUS FOR INDICATING STOPPING MBMS TRANSMISSION IN WIRELESS COMMUNICATION SYSTEM

CROSS REFERENCE TO RELATED APPLICATION

This application is the National Phase of PCT International Application No. PCT/KR2014/009002, filed on Sep. 26, 2014, which claims priority under 35 U.S.C. 119(e) to U.S. Provisional Application No. 61/883,162, filed on Sep. 26, 2013, all of which are hereby expressly incorporated by reference into the present application.

TECHNICAL FIELD

The present invention relates to wireless communications, and more particularly, to a method and apparatus for indicating stopping multimedia broadcast multicast service (MBMS) transmission in a wireless communication system.

BACKGROUND ART

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Public safety networks provide communications for services like police, fire and ambulance. In this realm the requirement has been to develop systems that are highly robust and can address the specific communication needs of emergency services. This has fostered public safety standards that provide for a set of features that were not previously supported in commercial cellular systems. These standards have also been applied to commercial critical communications needs such as airport operations.

Two main areas of 3GPP LTE enhancement have been discussed to address public safety applications. First area is proximity services (ProSe) that identify mobiles in physical proximity and enable optimized communications between them. Second area is group call system enablers that support the fundamental requirement for efficient and dynamic group communications operations such as one-to-many calling and dispatcher working.

The 3GPP LTE can provide a multimedia broadcast multicast service (MBMS) service. The MBMS is a service which simultaneously transmits data packets to multiple users. If a specific level of users exist in the same cell, the respective users can be allowed to share necessary resources so that the plurality of users can receive the same multimedia data, thereby increasing resource efficiency. In addition, a multimedia service can be used with a low cost from the perspective of users.

One of the objectives of group communication is to evaluate ability of enhanced MBMS (E-MBMS) or other mechanisms to provide group communication for public safety applications. That is, it has been discussed that group communication for public safety applications may be provided via the E-MBMS or other mechanism. Meanwhile, according to situation, group communication, which is provided by the MBMS/E-MBMS, may be preferred to being provided by a unicast bearer.

A method for indicating stopping MBMS transmission for group communication may be required.

SUMMARY OF INVENTION

Technical Problem

The present invention provides a method and apparatus for indicating stopping multimedia broadcast multicast service (MBMS) transmission in a wireless communication system. The present invention provides a method for stopping MBMS reception for group communication. The present invention provides a method for changing a group communication from an MBMS session to a unicast bearer.

Solution to Problem

In an aspect, a method for stopping, by a user equipment (UE), receiving of a multimedia broadcast multicast service (MBMS) data in a wireless communication system is provided. The method includes receiving a MBMS data of group communication from a network, receiving an indication of stopping receiving the MBMS data from the network, and stopping receiving the MBMS data based on the indication.

In another aspect, a user equipment (UE) in a wireless communication system is provided. The UE includes a radio frequency (RF) unit for transmitting or receiving a radio signal, and a processor coupled to the RF unit, and configured to receive multimedia broadcast multicast service (MBMS)data of group communication from a network, receive an indication of stopping receiving the MBMS data from the network, and stop receiving the MBMS data based on the indication.

Advantageous Effects of Invention

Service interruption does not happen when a user equipment (UE) changes a group communication from an MBMS session to a unicast bearer.

BRIEF DESCRIPTION OF DRAWINGS

FIG. 1 shows LTE system architecture.

FIG. 2 shows a block diagram of architecture of a typical E-UTRAN and a typical EPC.

FIG. 3 shows a block diagram of a user plane protocol stack and a control plane protocol stack of an LTE system.

FIG. 4 shows an example of a physical channel structure.

FIG. 5 shows MBMS definitions.

FIG. 6 shows an enhanced MBMS (E-MBMS) logical architecture.

FIG. 7 shows overall of high level architecture view for GCSE_LTE.

FIG. 8 shows an example of a method for indicating stopping MBMS transmission according to an embodiment of the present invention.

FIG. 9 shows another example of a method for indicating stopping MBMS transmission according to an embodiment of the present invention.

FIG. 10 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack and a control plane protocol stack of an LTE system.

FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

$$\text{Transmit power} = \text{TransmitPilot} - \text{RxPilot} + \text{ULInterference} + \text{Offset} + \text{SNRRequired}$$

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

Multimedia Broadcast Multicast Services (MBMS) is described. It may be referred to Section 15 of 3GPP TS 36.300 V11.7.0 (2013 September), and Section 5.8 of 3GPP TS 36.331 V11.1.0 (2012 September).

FIG. 5 shows MBMS definitions. For MBMS, the following definitions may be introduced.

MBSFN synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: This is a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multicell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

In E-UTRAN, MBMS can be provided with single frequency network mode of operation (MBSFN) only on a frequency layer shared with non-MBMS services (set of cells supporting both unicast and MBMS transmissions, i.e., set of "MBMS/Unicast-mixed cells").

MBMS reception is possible for UEs in RRC_CONNECTED or RRC_IDLE states. Whenever receiving MBMS services, a user shall be notified of an incoming call, and originating calls shall be possible. Robust header compression (ROHC) is not supported for MBMS.

FIG. 6 shows an enhanced MBMS (E-MBMS) logical architecture. 3GPP LTE may support the MBMS, and 3GPP LTE-A may support the E-MBMS.

Referring to FIG. 6, the MCE is connected with the eNB via M2 interface, and with the MME via M3 interface. The MCE is a logical entity. The MCE may be a part of another network element. The functions of the MCE are as follows.

the admission control and the allocation of the radio resources used by all eNBs in the MBSFN area for multi-cell MBMS transmissions using MBSFN operation. The MCE decides not to establish the radio bearer(s) of the new MBMS service(s) if the radio resources are not sufficient for the corresponding MBMS service(s) or may preempt radio resources from other radio bearer(s) of ongoing MBMS service(s) according to allocation and retention priority (ARP). Besides allocation of the time/frequency radio resources this also includes deciding the further details of the radio configuration, e.g., the modulation and coding scheme.

counting and acquisition of counting results for MBMS service(s).

resumption of MBMS session(s) within MBSFN area(s) based on, e.g., the ARP and/or the counting results for the corresponding MBMS service(s).

suspension of MBMS session(s) within MBSFN area(s) based on, e.g., the ARP and/or on the counting results for the corresponding MBMS service(s).

The MCE is involved in MBMS session control signaling. The MCE does not perform UE-MCE signaling. An eNB is served by a single MCE.

The MBMS GW is a logical entity. The MBMS GW may be a part of another network element. The MBMS G is present between the BMSC and eNBs whose principal functions is the sending/broadcasting of MBMS packets to each eNB transmitting the service. The MBMS GW uses IP multicast as the means of forwarding MBMS user data to the eNB. The MBMS GW performs MBMS session control signaling (session start/update/stop) towards the E-UTRAN via the MME.

The M3 interface is a control plane interface which connects between the MCE and MME. An application part is defined for this interface between the MME and MCE. This application part allows for MBMS session control signaling on E-UTRAN radio access bearer (E-RAB) level (i.e., does not convey radio configuration data). The procedures comprise, e.g., MBMS session start and stop. Stream control transmission protocol (SCTP) is used as signaling transport i.e., point-to-point signaling is applied.

The M2 interface is a control plane interface which connects between the MCE and eNB. An application part is defined for this interface, which conveys at least radio configuration data for the multi-cell transmission mode eNBs and session control signaling. SCTP is used as signaling transport, i.e., point-to-point signaling is applied.

The M1 interface is a pure user plane interface which connects the MBMS GW and eNB. Consequently no control plane application part is defined for this interface. IP multicast is used for point-to-multipoint delivery of user packets.

In general, the control rmation relevant only for UEs supporting MBMS is separated as much as possible from unicast control rmation. Most of the MBMS control rmation is provided on a logical channel specific for MBMS common control rmation, i.e., the MCCH. E-UTRA employs one MCCH logical channel per MBSFN area. In case the network configures multiple MBSFN areas, the UE acquires the MBMS control rmation from the MCCHs that are configured to identify if services it is interested to receive are ongoing. It may be assumed that an MBMS capable UE is only required to support reception of a single MBMS service at a time. The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC_CONNECTED that are receiving or interested to receive one or more specific MBMS services.

A limited amount of MBMS control rmation is provided on the BCCH. This primarily concerns the rmation needed to acquire the MCCH(s). This rmation is carried by means of a single MBMS specific system information block, i.e., SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

The MCCH rmation is transmitted periodically, using a configurable repetition period. Scheduling rmation is not provided for MCCH, i.e., both the time domain scheduling as well as the lower layer configuration are semi-statically configured, as defined within SystemInformationBlockType13.

For MBMS user data, which is carried by the MTCH logical channel, E-UTRAN periodically provides MCH scheduling rmation (MSI) at lower layers (MAC). This MCH rmation only concerns the time domain scheduling, i.e., the frequency domain scheduling and the lower layer configuration are semi-statically configured. The periodicity of the MSI is configurable and defined by the MCH scheduling period.

Group communication is described. It may be referred to 3GPP TR 23.768 V0.3.0 (2013 July). A few terms may be defined for supporting group communication service enabler (GCSE) or GCSE over LTE (GSCE_LTE). GCSE group is a set of members that are entitled to participate in a group communication service. Multipoint service is a service, which is offered to the GCSE application server (AS) and used to distribute the same group communication data to the UEs of a GCSE Group in a resource efficient way. Multicast delivery is a delivery mode where the group communication data is delivered via shared network resources to multiple group members. Unicast delivery is a delivery mode where the group communication data is delivered to a particular group member via resources dedicated to a group member.

FIG. 7 shows overall of high level architecture view for GCSE_LTE. Referring to FIG. 7, the high-level architecture described in FIG. 7 consists of application layer and 3GPP evolved packet system (EPS) layer. The application layer consists of GCSE AS. The 3GPP EPS layer consists of a MuSe function. The MuSe function interworks with the 3GPP EPS entities to provide the multipoint service functionality.

There are a few reference points in the high level architecture for GCSE_LTE.

GC1: It is the reference point between the GCSE application in the UE and in the GSCE AS. It is used to define application level signaling requirement to enable multipoint functionality for GCSE_LTE, and possibly for session establishment and floor control usages, etc.

GC2: It is the reference point between the GCSE AS and the MuSe function. It is used to define the interaction between GCSE AS and MuSe functionality provided by the 3GPP EPS layer.

GC3: It is the reference point between the E-UTRAN and MuSe function. It is used to define the interaction between E-UTRAN and MuSe function in order to achieve multipoint functionality provided by the 3GPP EPS layer.

GC4: It is the reference point between the MME and MuSe function. It is used to define the interaction between MME and MuSe function in order to achieve multipoint functionality provided by the 3GPP EPS layer.

GC5: It is the reference point between the P-GW and MuSe function. It is used to provide DL unicast service by MuSe.

The architecture described above shall allow as an option for the GCSE AS to determine whether to deliver the group call data using unicast delivery or multicast delivery or both.

To support group communication via MBMS or E-MBMS, the network may be able to turn on/off transmission of a specific MBMS session at a cell, depending on how many UEs are receiving the MBMS session at the cell. According to the prior art, when the eNB turns off transmission of a specific MBMS session, the UE receiving the MBMS session may know turning off only by detecting no existence of MBMS session information in the MCCH information. Such UE autonomous detection may result in service interruption when the UE changes the group communication from the MBMS session to a unicast bearer.

A method for indicating stopping MBMS transmission for group communication according to an embodiment of the present invention is described. Hereinafter, it is assumed that the MBMS represents both the MBMS and the E-MBMS.

FIG. 8 shows an example of a method for indicating stopping MBMS transmission according to an embodiment of the present invention.

In step S100, the UE receives a MBMS data of group communication from a network. A group related to the group communication may be a GCSE group which includes a set of members participating in a group communication service. The UE may belong to the group. The MBMS data may be received via the MTCH. The UE may further monitor control information for the MBMS data. The control information may be MCCH information received via the MCCH.

In step S110, the UE receives an indication of stopping receiving the MBMS data from the network. The indication may be received via one of a UE dedicated signaling on the DCCH, MCCH information on the n MCCH, MAC CE on the MCH, or layer-1 signaling on the PDCCH. The UE dedicated signaling may be one of a GCSE application message, a NAS message, an RRC message, a MAC CE, or layer-1 or 2 signaling.

In step S120, the UE stops receiving the MBMS data based on the indication. The UE may inform the network that receiving the MBMS data is stopped. Upon stopping receiving the MBMS data, the UE may receives data of the group communication via a UE dedicated traffic channel. Accordingly, data for the group communication can be provided via a unicast bearer instead of the MBMS session.

FIG. 9 shows another example of a method for indicating stopping MBMS transmission according to an embodiment of the present invention.

In step S200, the UE monitors broadcast/multicast control information about the service related to the group. The UE may monitor broadcast/multicast control information via the MCCH. The broadcast/multicast control information may be MCCH information. i.e., an RRC message carried on the MCCH.

In step S210, the UE receives broadcast/multicast data related to the service of the group. The data may be carried on the MTCH.

In step S220, the UE receives an indication of stop of the service of the group on the MTCH. The indication may be carried via one of a UE dedicated signaling on the DCCH, MCCH information on the MCCH, MAC control element (CE) on the MCH, or Layer 1 signaling on the PDCCH. Specifically, the UE dedicated signaling may one of a GCSE application message, a NAS message, an RRC message, MAC CE, and layer 1 or 2 signaling.

In step S230, the UE stops receiving the MTCH, and also stops monitoring broadcast/multicast control information on the MCCH, based on the indication.

In step S240, the UE informs the network or the server about the stop of the service of the group. Accordingly, the UE may start receiving data related to the group from a UE dedicated traffic channel, i.e., DTCH.

Hereinafter, additional description for the present is described.

(1) Currently, both UE in RRC_IDLE and UE in RRC_CONNECTED can receive MBMS services on MBSFN areas. However, it seems to be not the case for group communication, considering that group members may need uplink channel to say hello each other. That is, it may be assumed that when the UE is involved in group communication, the UE will be in RRC_CONNECTED soon. Upon initiation of group communication, the network may page UEs in RRC_IDLE to trigger RRC connection establishments with 'MT access'.

This assumption may make it easier to discuss service continuity and radio efficiency for group communication.

For instance, if it is assumed that the UE will be in RRC_CONNECTED, transition from unicast to E-MBMS would not require a new type of access in RRC connection establishment, compared to connection establishment with 'MBMS cause' in UMTS. And, in transition from E-MBMS to unicast, the network may easily establish a unicast bearer for service continuity of group communication. Even, the UE may be able to configure both DRB and MRB for the same group communication for fast transition.

Accordingly, it may be proposed that while the UE is involved in group communication, the UE will be in RRC_CONNECTED. In addition, it may be also proposed that RRC connection establishment driven by E-MBMS purpose is not specified.

(2) The resource efficiency aspect is considered as a top priority of study on the group communication. One of main issues on the resource efficiency aspect is 'multicast/unicast handling'. Such handling may correspond to network ability of switching data delivery between E-MBMS and unicast for a specific service and for a specific UE receiving the service.

Such network ability seems based on knowledge about what kind of MBMS service a specific UE is receiving and how many UEs are involved in a specific group communication. However, the existing network does not know which MBMS service UE is receiving, regardless of RRC state. The network may only know a MBMS frequency that the UE in RRC_CONNECTED is receiving, based on the MBMS interest indication message, because the MBMS interest indication message indicates the MBMS frequency only (with MBMS priority).

Even though counting function is used to help the network know how many UEs in RRC_CONNECTED are receiving a specific MBMS service, the network would need to perform counting every modification period, in order to keep track of MBMS reception status in UEs, because MBMS reception status may change in UEs any time. However, using counting every period would result in significant uplink signaling burden in high load situation which group communication mainly concerns.

Nevertheless, if it is desirable to enable the network to switch a group communication between E-MBMS and unicast, the network should know which groups a specific UE belongs to, in order to evaluate how many UEs are involved in the group communication for a specific cell and then decide transmission mode between unicast and E-MBMS for the group.

Individual UEs may inform E-UTRAN about interesting MBMS services for group communication by using MBMS interest indication messages, in order to help the network to perform switching. If it is the case, considering that MBMS interest indication messages are currently transferred over X2 during handover, the eNB may always maintain up to date information about UE specific MBMS reception status. With this X2 transfer, uplink signaling load in high load situation may be avoided.

Accordingly, it may be proposed that MBMS service level information is added in the MBMS interest indication message in order to help the network to evaluate how many UEs are involved in the group communication at a particular cell. Based on this information, E-UTRAN may turn on/off a specific MBMS session at a cell.

Further, if transition between MBMS and unicast frequently happen, switching may result in additional cost such as signaling burden and service interruption. For instance, whenever the UE moves between a cell using unicast to another cell using MBMS for the same group communication, the UE would apply reconfiguration and also lose some packets in transition. Such additional cost may undermine a benefit of resource efficiency that we may achieve with switching between unicast and MBMS.

One of ways to avoid signaling burden and service interruption seems to be that the network always configures a unicast bearer, i.e., DRB in a UE for on-going group communication, even while the UE is receiving MBMS for the same group communication, assuming that downlink data is transmitted via only one of DRB and MRB. If it is the case, switching data delivery may be up to an application layer.

For instance, if the UE moves to a cell not serving the group via MBMS, or if the UE detects no group communication in a MBSFN area, the UE would stop receiving the MBMS, and then the application layer in the UE may communicate with the application server to resume the group communication via the already configured unicast bearer.

On the other hand, if the UE moves to a cell serving the group via MBMS, or if the UE detects the group communication in a MBSFN area, the application layer in the UE may communicate with the application server to suspend the group communication via the already configured unicast bearer. Then, UE may start receiving MTCH for the group communication.

Assuming that the network can always configure DRB for on-going group communication regardless of MBMS transmission, and also the application layer may communicate with the application server for unicast transmission, switching data delivery may rely on the application layer.

(3) The service continuity aspect is considered as a top priority of study on the group communication. For service continuity, we may need to take into account the following scenarios:

1) Service continuity of the same group communication between E-MBMS and unicast at the same cell Service continuity from E-MBMS to unicast at the same cell: The network may change delivery of the group communication from MRB to DRB for group members at a cell, e.g., because the number of group members becomes lower than a threshold.

Service continuity from unicast to E-MBMS at the same cell: The network may change delivery of the group communication from DBR to MRB for group members at a cell, e.g., because the number of group members becomes larger than a threshold.

2) Service continuity of the same group communication between E-MBMS and unicast at different cells (handover)

Service continuity from E-MBMS to unicast at different cells: When the UE performing group communication over E-MBMS moves to a target cell, it may find out that the target cell is not broadcasting a MBMS service corresponding to the group communication. It is because the cell may be offering unicast transmissions to member UEs in the group, or the cell has not served member UEs in the group.

Service continuity from unicast to E-MBMS at different cells: When the UE performing group communication over unicast moves to a target cell, it may find out that the target cell is broadcasting a MBMS service corresponding to the group communication, while not providing unicast transmission of the group communication. It is because the target cell decided to provide the group communication over E-MBMS, e.g., due to resource efficiency.

3) Service continuity of the same group communication between different MBSFN areas on the same frequency or different frequencies: When the UE performing group communication over E-MBMS moves from a source cell to a target cell, it may find out that the target cell is broadcasting a MBMS service corresponding to the same group communication in different MBSFN area. Namely, source MBSFN area and target MBSFN area are different MBSFN areas (on the same frequency or different frequencies). It is because MBSFN areas may be geographically limited, i.e., one MBSFN area could not cover a whole country.

It should be discussed whether all those scenarios or some of them are supported.

The UE performing group communication may move to a cell not serving the group via E-MBMS. Hence, it would be good to discuss which type of transmission the target cell will provide to the incoming UE performing the group communication, i.e., unicast or E-MBMS, if the target cell is currently offering unicast transmissions for the group or if the target cell has not provided any transmission for the group (i.e. no group member, before).

The target cell may start MBMS transmission as soon as the UE moves to the target cell, because the number of group members becomes larger than a threshold, or may provide unicast transmission to the incoming UE.

If the network starts MBMS transmission for the group, it would take some time to start MBMS service, e.g., due to MCCH update in long MCCH modification period. How the network will start MBMS session transmission for incoming UE at a specific cell for GCSE, e.g., by request from the incoming UE or by evaluation in the network is unclear.

Considering initial setup time of transmission and public safety use cases, if the target cell is already offering the group communication to group members via unicast bearers, or if the target cell has not provided the group communication before, it would be desirable that the target cell provides unicast transmission to the incoming UE. From UE perspective, if the UE moves from a cell serving the group via unicast bearer, the UE would continue to rely on the unicast bearer, like a normal handover case.

It means that it is not assumed that incoming UE requests a MBMS session transmission to the network for a specific cell not providing the MBMS session. Anyway, the network may decide to change from unicast to MBMS as the number of group members increases at the cell, e.g., by evaluating the number of group members at the network.

The UE performing group communication may move to a cell serving the group via E-MBMS. In this case, we currently rely on UE internal behavior. However, it is unclear whether or not legacy operation is sufficient for public safety due to potential service interruption time.

For instance, if source cell and target cell belong to different MBSFN areas for the same group communication, normal MBMS UE will autonomously detects the group communication on MCCH, and then receives MTCH for the group. However, it may take a longer time than normal handover of DRB.

Thus, whether or not legacy MBMS UE operation is sufficient for public safety due to potential service interruption time need to be verified, particularly in the case that the UE moves from one MBSFN area to another MBSFN area for the same group communication.

FIG. 10 shows a wireless communication system to implement an embodiment of the present invention.

An eNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for stopping a reception of a multimedia broadcast multicast service (MBMS) data of group communication in a wireless communication system, the method comprising:

transmitting, by a user equipment (UE), an MBMS interest indication message for informing a network about MBMS services of interest for the group communication, wherein the MBMS interest indication message is transmitted over an X2 interface during a handover, wherein MBMS service level information is added with the MBMS interest indication message in order to count a number of UEs in the group communication, and wherein the counted number of UEs in the group communication is used to maintain a level of MBMS reception status of UE by the network;

receiving, by the UE, the MBMS data of group communication transmitted by the network in response to the MBMS interest indication message;

determining, by the UE, whether a transmission mode of the UE is switched from an MBMS mode to a unicast mode;

when the UE determines that the transmission mode of the UE is switched from the MBMS mode to the unicast mode, transmitting, by the UE, a first indication indicating that the transmission mode of the UE is switched from the MBMS mode to the unicast mode;

receiving, by the UE, a second indication indicating that the reception of the MBMS data from the network should be stopped, wherein the second indication is a UE-dedicated signaling on a dedicated control channel (DCCH); and stopping, by the UE, the reception of the MBMS data from the network upon the receiving the second indication.

2. The method of claim 1, wherein a group for the group communication is a group communication service enabler (GCSE) group which includes a set of members participating in a group communication service.

3. The method of claim 2, wherein the UE belongs to the group.

4. The method of claim 1, wherein the MBMS data is received via a multicast traffic channel (MTCH).

5. The method of claim 1, wherein the receiving the MBMS data comprises:
monitoring control information for the MBMS data.

6. The method of claim 5, wherein the control information is multicast control channel (MCCH) information received via an MCCH.

7. The method of claim 1, further comprising:
informing the network of the stopping the reception of the MBMS data from the network.

8. The method of claim 1, further comprising:
upon the stopping the reception of the MBMS data from the network, receiving data of the group communication via a UE-dedicated traffic channel.

9. A user equipment (UE) in a wireless communication system, the UE comprising:
a transceiver configured to transmit or receive a radio signal; and
a processor coupled to the transceiver, wherein the processor is configured to:
control the transceiver to transmit a multimedia broadcast multicast service (MBMS) interest indication message for informing a network about MBMS services of interest for a group communication, wherein the MBMS interest indication message is transmitted over an X2 interface during a handover, wherein MBMS service level information is added with the MBMS interest indication message in order to count a number of UEs in the group communication, and wherein the counted number of UEs in the group communication is used to maintain a level of MBMS reception status of UE by the network, control the transceiver to receive MBMS data of group communication transmitted by the network in response to the MBMS interest indication message, determine whether a transmission mode of the UE is switched from an MBMS mode to a unicast mode, when the processor determines that the transmission mode of the UE is switched from the MBMS mode to the unicast mode, control the transceiver to transmit a first indication indicating that the transmission mode of the UE is switched from the MBMS mode to the unicast mode, control the transceiver to receive a second indication indicating that the reception of the MBMS data from the network should be stopped, wherein the second indication is a UE-dedicated signaling on a dedicated control channel (DCCH), and stop the reception of the MBMS data from the network upon receiving the second indication.

10. The UE of claim 9, wherein a group for the group communication is a group communication service enabler (GCSE) group which includes a set of members participating in a group communication service.

11. The UE of claim 10, wherein the UE belongs to the group.

* * * * *